US006788308B2

(12) United States Patent
Reavy et al.

(10) Patent No.: US 6,788,308 B2
(45) Date of Patent: Sep. 7, 2004

(54) SYSTEM AND METHOD FOR IMPROVING THE READABILITY OF TEXT

(75) Inventors: Maire Reavy, Downingtown, PA (US); Randell Jesup, Downingtown, PA (US)

(73) Assignee: TVGateway,LLC, Philadelphia, PA (US)

( * ) Notice: Subject to any disclaimer, the term of this patent is extended or adjusted under 35 U.S.C. 154(b) by 0 days.

(21) Appl. No.: 09/996,207

(22) Filed: Nov. 28, 2001

(65) Prior Publication Data

US 2002/0113801 A1 Aug. 22, 2002

Related U.S. Application Data

(60) Provisional application No. 60/253,826, filed on Nov. 29, 2000.

(51) Int. Cl.[7] .......................... G09G 5/02; G09G 5/00; H04N 9/64; H04N 5/445; G06K 9/34

(52) U.S. Cl. ...................... 345/617; 345/589; 345/630; 345/636; 348/566; 348/649; 382/176

(58) Field of Search ............................... 345/589, 426, 345/428, 581, 592–593, 597, 605, 629–630, 631–632, 636, 611, 687, 689, 718, 690, 22–26, 617, 616, 640; 348/468, 564, 567, 560, 562, 566, 577, 582, 597, 599, 603, 617, 621, 630, 635, 649, 673; 382/162–167, 176–178; 358/515–520

(56) References Cited

U.S. PATENT DOCUMENTS

| | | | | | |
|---|---|---|---|---|---|
| 5,113,356 | A | * | 5/1992 | Nickell et al. | 358/1.8 |
| 5,469,536 | A | * | 11/1995 | Blank | 345/594 |
| 5,961,603 | A | * | 10/1999 | Kunkel et al. | 709/229 |
| 5,999,970 | A | * | 12/1999 | Krisbergh et al. | 725/109 |
| 6,148,102 | A | * | 11/2000 | Stolin | 382/164 |
| 6,199,114 | B1 | * | 3/2001 | White et al. | 709/229 |
| 6,519,362 | B1 | * | 2/2003 | Cusmariu | 370/442 |

* cited by examiner

*Primary Examiner*—Matthew C. Bella
*Assistant Examiner*—Wesner Sajous
(74) *Attorney, Agent, or Firm*—Moser, Patterson & Sheridan LLP

(57) ABSTRACT

Display data comprising text and a background are processed. A combination of the text and background is evaluated against one or more objective criteria to provide one or more objective values. A determination is made whether the one or more objective values exceed one or more respective thresholds that are indicative of text-background combinations that are difficult to read. The text or the background or both are adjusted if any of the one or more thresholds is exceeded, so that the one or more thresholds are no longer exceeded after the adjusting.

30 Claims, 4 Drawing Sheets

SYSTEM AND METHOD FOR IMPROVING THE READABILITY OF TEXT

This application claims the benefit of U.S. Provisional Patent Application No. 60/253,826, filed Nov. 29, 2000.

FIELD OF THE INVENTION

The present invention relates to systems for displaying text and graphics and particularly to systems for displaying text on television displays.

BACKGROUND

Systems have been developed for displaying computer or internet type information on conventional television monitors. For example, the WordGate service provided by WorldGate Communications, Inc. of Trevose, Pa. allows the display of Worldwide Web pages on a television monitor. Such a system is disclosed in U.S. Pat. No. 5,999,970 issued to Krisbergh, et al. and U.S. Pat. No. 5,961,603 issued to Kunkel, et al., the disclosures of which are hereby incorporated by reference herein in their entireties.

The formats used for displaying graphics and text on computer monitors are not always optimal for other types of display systems. Many display systems, such as televisions built to display information encoded in NTSC and PAL formats, differ from computer monitors in that they cause certain combinations of colors to be more difficult to read than other combinations. For example, green text on a purple background may be difficult to read. These systems may also cause text having colors and brightness levels similar to those of the background to be difficult to read.

This difficulty in reading displayed text can be particularly troublesome in systems that display Internet information on a television, because information which was originally intended to be displayed on a computer monitor is being displayed on a television.

Thus, a need exists for a display system providing improved readability of text when the text is difficult to read.

SUMMARY OF THE INVENTION

The invention is a method, system and computer readable medium for processing display data comprising text and a background. A combination of the text and background is evaluated against one or more objective criteria to provide one or more objective values. A determination is made whether one or more of the objective values is beyond one or more respective thresholds that are indicative of text-background combinations that are difficult to read. One of the group consisting of the text and the background is adjusted if the one or more objective values are beyond any of the one or more thresholds, so that the objective values are within the one or more thresholds after the adjusting.

DETAILED DESCRIPTION OF THE EXEMPLARY EMBODIMENT OF THE INVENTION

Figure 1:
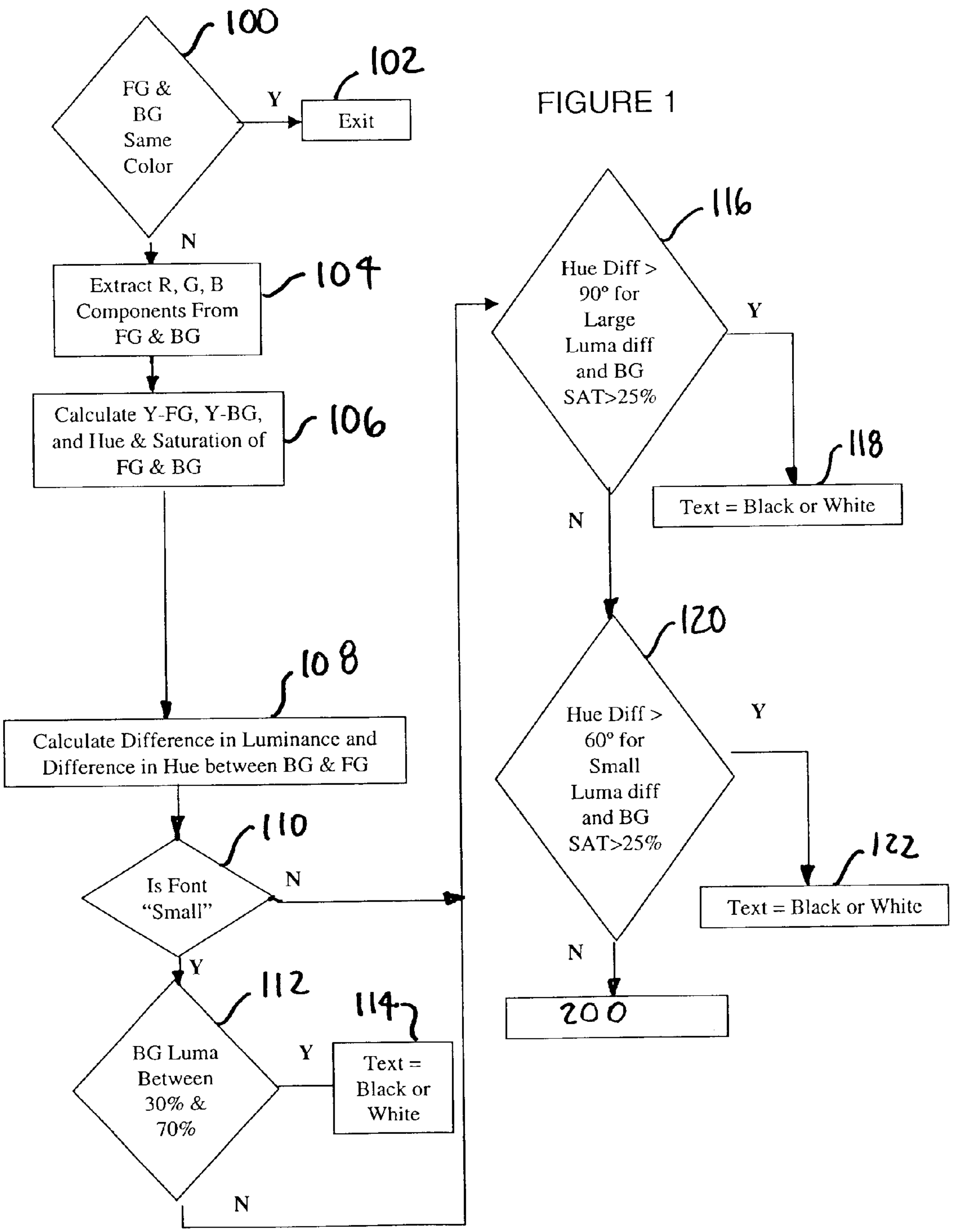
FIGS. 1–3 are flow chart diagrams of an exemplary system and method according to the present invention.

In an exemplary embodiment of the invention, the text (foreground, or FG) and background (BG) are evaluated to determine if the text is likely to be difficult to read, using one or more objective, quantifiable criteria. Note that the terms "text" and "foreground" are used interchangeably throughout this application to cover not only alphanumeric characters, but special characters (e.g., ®, £), symbols (e.g., Ω), kanji and characters from other alphabets, such as Cyrillic, Greek, Hebrew and Arabic. If the text is difficult to read, parameters associated with the text, the background, or both are adjusted to improve readability of the text. The factors included in this evaluation may include: text color hue, text color saturation, text color luminosity, background color hue, background color saturation, background color luminosity, text font, text font size, and text characteristics (e.g., shadowing, underlining, bold, italics, blinking). In some embodiments of the invention, the evaluation may include consideration of factors that are particular to the display or the viewer. These may include, for example, the type of television (e.g. digital, analog), connection method (RF, composite video, component video, or RGB), personal preferences of the viewer (e.g., poor eyesight requiring larger text, partial color blindness requiring avoidance of certain colors), whether the text is on top of an image or not, the colors used in that image and in particular in the area covered by the text, the size of the text, whether the TV has been calibrated, the reason the text is being displayed (e.g., text is a hyperlink), and the relative importance of the text.

Parameters to be adjusted may include one or more of the following: text color hue, text color saturation, text color luminosity, background color hue, background color saturation, background color luminosity, text font, text font size, and text characteristics (e.g., shadowing, underlining, bold, italics, blinking).

The evaluation and parameter modification may be accomplished at various stages and locations in the transmission and display process and system. For example, the evaluation and parameter modification may be accomplished by a browser before the text is displayed, by a display processor (e.g., X-server or graphics driver), by the set top, or by a transforming cache that is used by a browser, or any combination of these. The browser, display processor and transforming cache may reside at the cable or satellite transmission head-end, in a set top box, in the display device (e.g., television), or any combination thereof. The browser or transforming cache may interpret the text and the background, prior to parameter modification. The graphics processor actually does the drawing, and may also interpret display information prior to parameter adjustment.

Figure 4:
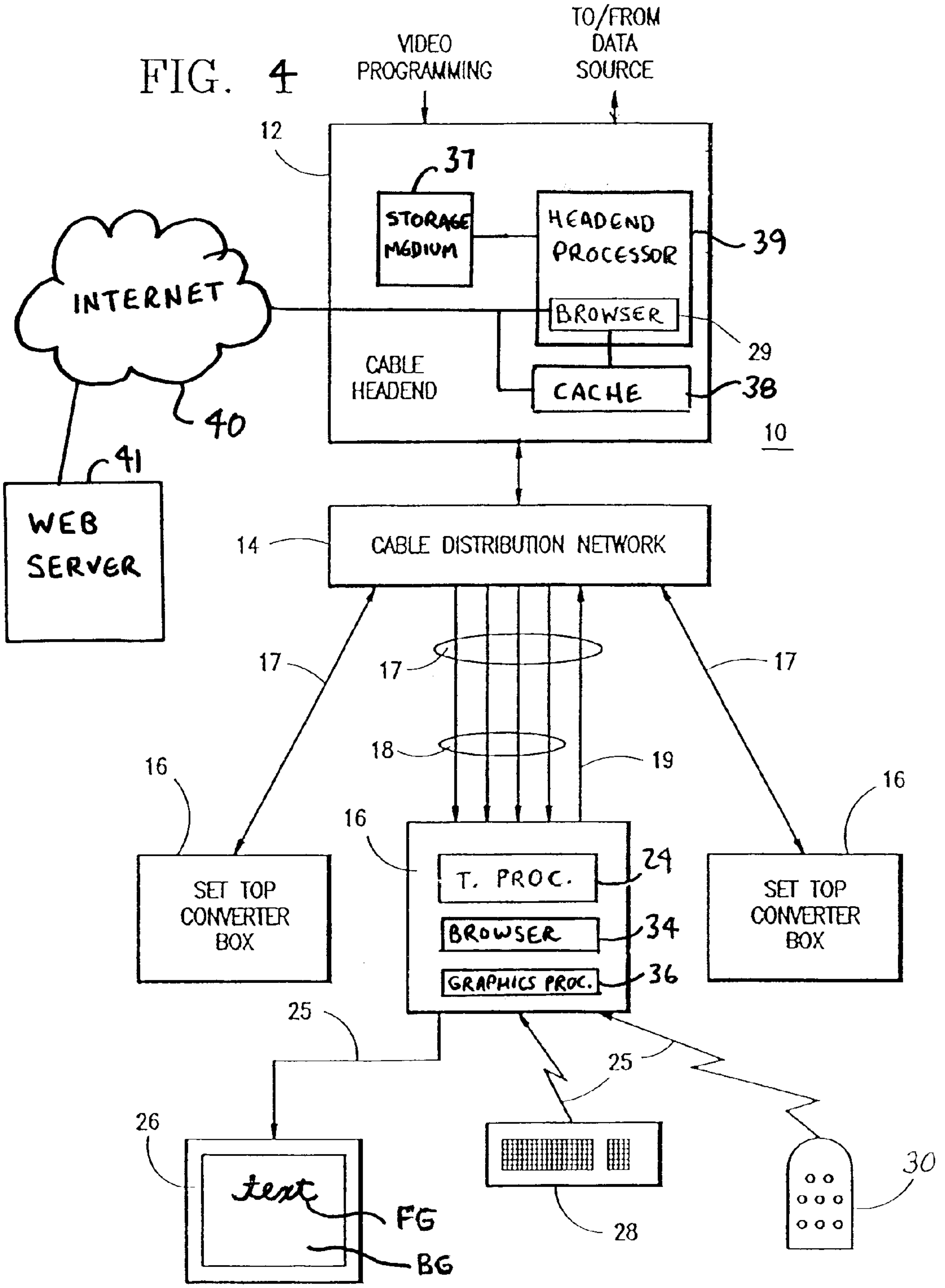
FIG. 4 is a block diagram of an exemplary system in which the invention may be practiced.

FIG. 4 is a block diagram of an exemplary CATV system 10, which incorporates elements for facilitating the provision of television services and is illustrative of one type of system within which the concepts of the present invention may be employed. It should be noted that the CATV system 10 is illustrated in general form since many of its detailed elements are not necessary for an understanding of the present invention.

The CATV system 10 includes a cable headend 12 and a cable television distribution network 14 for interfacing the headend 12 to a plurality of set top converter boxes 16. A plurality of transmission links 17 interconnects the set top converter boxes 16 with the distribution network 14. Each of the links 17 is illustrated as being bi-directional with a plurality of downstream channels 18 and one or more upstream channels 19. It will be understood by those of ordinary skill in the art that the links in the present invention are not limited to bi-directional links but they may be one directional links. For clarity, the details of only one of the set top boxes 16 and associated elements are illustrated in FIG. 1.

The cable headend 12 receives video programming from remote sources (not shown), and transmits the video programming and other information through the distribution network 14 to the set top boxes 16. Typically, the video programming is received from the remote source in either an analog format, or a digitally compressed or encoded format, such as MPEG 1 or MPEG 2. Cable headend 12 includes cable headend equipment (not shown), consumer service unit/digital service unit (not shown), router (not shown) and headend server (not shown). The headend server has a communications controller and an application server 39 that may include browsers 29, billing applications and the like. A storage medium 37, such as a hard disk drive, optical drive, tape drive, removable disk drive, or the like is provided.

A set top box 16 is a device that is typically located physically close to the display device (e.g., television). Each of the set top boxes 16 is interfaced via a terminal processor 24 and associated communication links 25 (e.g., cables, infrared wireless links, etc.) to a television or monitor 26, and one or more input devices, such as a wireless keyboard 28 and a remote controller 30. Preferably, the remote control device 30 comprises a computer style keyboard, which communicates with the set top converter box 16 by means of a conventional infrared wireless link. Additionally, a pointing device, such as a mouse or the like (not shown), may be used in conjunction with the keyboard 28. Alternatively, the remote control device 30 may also comprise a conventional television remote control.

The browser 34, the graphics processor 36, or a combination of the two may reside in the set top box and evaluate and modify the rendered text and background. An advantage of evaluating and modifying parameters in the set top box is that the set top box can be configured to obtain information from the television or the viewer, such as the type of television (e.g., analog, digital, flat panel), amount of ambient light in the viewing area, whether the television has been properly calibrated, and viewer preferences.

Further, the evaluation and parameter modification may take place in a cache device 38 that acts as a proxy for the browser 29. It is known to use a cache device 38 as a proxy for the browser 29 to reduce the amount of processing and bandwidth required when information is to be displayed frequently. For example, a cache 38 containing frequently accessed Web pages may be located at the head end 12, eliminating the need to obtain the pages from the Internet 40 (or web server 41) when one of the pages is requested by a viewer. Information is traditionally captured and stored in its original form (e.g., HTML, image, XML, etc), but in this usage the transforming cache 38 would modify the data as explained in this patent before being stored.

In an exemplary embodiment of the invention where a transforming cache 38 is used, text and background information are evaluated, parameters are modified, and the modified display information is stored in the transforming cache. Thus, evaluation and modification need be done only once for a given page. For example, on the first request from a browser 29 for a specific page, the transforming cache 38 fetches the information. The information is evaluated and modified to improve readability, and stored in the cache 38 as well as being passed to the requesting browser 29 (or 34). Subsequent viewers (including the same viewer) access the modified information stored in the cache, thus eliminating the need to evaluate and modify the information again.

Color comprises the characteristics of luminance (brightness), hue, and saturation. Hue is defined as the color perceived when light of one or more wavelengths is viewed. Brightness refers to the intensity of the light being observed. Thus, a color may be perceived as being brighter or darker depending upon its intensity. If the intensity of a color were reduced to the point where it is no longer visible, it would be placed on a brightness scale corresponding to black. Similarly, if the color's intensity were increased sufficiently, its brightness level would correspond to white. Saturation describes the degree of purity of a color and its absence of white. For example, red is a fundamental hue that, when diluted by the addition of white, becomes pink. Thus, pale or pastel shades of hue are less saturated than are vivid shades of color. Note that saturation is related to brightness such that increasing the white content of a saturated color increases its energy content, thus making it brighter.

Aspects of color encoding in television systems may be analogized to a color wheel. Looking at a color wheel, the difference between two colors may be represented by the angle between them. Saturation is represented by the distance from the center of the wheel (magnitude). In television systems, such as NTSC for example, a color signal is encoded as a sinusoidal signal, and the difference in colors is encoded as the angular difference in phase between the signals. Saturation is encoded as the magnitude of the signal. The further apart two colors are on the color wheel, the greater the physical distance on the display that is needed on the television in order to transition from one color to the next. For example, green and purple are exactly opposite each other on a color wheel. Thus, green text on a purple background would look blurred or muddy and be difficult to read, primarily because of the relatively long time it takes to transition from the one color to the other. The further apart two colors are on the color wheel, the greater the difference in phase (phase angle) between their corresponding television signals.

One embodiment of the invention improves text readability by reducing the difference in phase angle between the text and background colors. In some television systems, for example NTSC TV, hue is encoded as a phase angle. The greater the phase difference between certain colors the more time (space on the screen) is required to change between the colors. In one exemplary embodiment of the invention, the phase difference between the foreground text and the background color (or image) is evaluated. If the phase angle difference is too large, the foreground and/or background are modified in hue, saturation, or brightness. In another exemplary embodiment of the invention, the text is forced to white or black depending either on whether the text was originally lighter or darker, respectively, than the background, or which will give the largest contrast between the foreground and background.

Other factors which tend to make text difficult to read are the text and the background being close in brightness (contrast) and color, and heavy saturation. An example of the text and background being close in brightness and color is light blue text on a slightly darker blue background, which can be very difficult to read on a television display system. Maximum, or close to maximum, saturation of the text tends to blur the text. An example of over saturated text is an eye-searing orange or blue text. In this example, the text is both bright and heavily saturated, which tends to overdrive the television electronics. Further, if the background is heavily saturated, the text may also be difficult to read. If both foreground and background are heavily saturated the text will be even harder to read.

If the contrast (the difference between text and background luminosity) is too low, the contrast may be enhanced by increasing the luminosity difference between the foreground and background. Further, highly saturated colors may not be properly displayed, especially for fine detail such as text. Thus saturation of the text and/or background may be reduced to improve readability.

The saturation and/or luminosity of the entire page may also be limited so as to improve readability of text on the page. This is particularly applicable to text embedded in images. Such a global limitation avoids separate adjustment of the backgrounds for different sections of the display. This global limitation further avoids the possibility of two sections of the background being changed to different colors when the two background sections are supposed to have the same color.

Cases where the text and background are exactly the same (i.e., same hue, luminosity, and saturation) are not intended to be visible, and thus are not modified.

To compensate for gamma effects (level of brightness linearity) in the display device, another factor in deciding whether to modify (and by how much to modify) is the absolute intended luminosity. If the text and background are both dark, increasing the difference in brightness to improve readability requires a larger difference in brightness than if the text and background are not both dark. Very dark colors tend to appear black. For example, at the very low end of the brightness scale, a 10% difference in brightness is barely visible. However, at the middle of the brightness scale, a 10% brightness is much more easily visible. Thus, in some exemplary embodiments of the invention, the difference in brightness is evaluated prior to adjusting parameters. At the lower end of the brightness scale, the amount of brightness difference to improve readability is greater than at the middle of the brightness scale. This modification could either employ based on a single threshold, a plurality of incremental thresholds, or continuously varying levels.

In an exemplary embodiment of the invention, text parameters are adjusted according to the luminosity of the text and the background, the difference in phase angle between the text and the background, and the saturation level of the text. However, the closer the colors are in luminosity, the more that phase angle contributes to difficulty in reading the text. Thus, in some embodiments of the invention, if the luminosity of the text and the background differ by more than 20%, the text is changed to either black or white if the difference in phase angle between the text and the background is equal to or greater than 90 degrees. If the luminosity of the text and the background differ by less than the aforementioned 20%, the text is changed to either black or white if the difference in phase angle between the text and the background is equal to or greater than 60 degrees. And if the luminosity difference between the text and the background is close to 100% (i.e., one is close to white and the other is close to black), no change is made to the text regardless of the difference in phase angle. At this point phase angle is an insignificant factor in determining the readability of the text. Note that these values are exemplary. For example, the text need not be modified to black or white, but may be modified to any appropriate color having a small enough difference in phase angle with the background to improve the readability of the text. Thus hue (angle) may be modified. For example, if text and background are purple and a green, respectively, instead of changing the purple text to white or black, the text may be changed to a color that is closer in phase angle to the background.

In another exemplary embodiment of the invention the size of the text is evaluated. The text size is relevant because the smaller the text, the smaller the distance between individual lines of the text and the smaller the width of the lines. And therefore, for smaller text, it is more critical it is to make sure there is sufficient contrast. Also, some text fonts use thinner lines for a given size than others. Thus text font is another parameter that is evaluated prior to modifying parameters to improve readability. Of particular interest is the average line size of the text. Text that has single pixel lines is typically difficult to read on a television display. With single pixel lines, the difference in phase angle and the level of saturation become more important factors in readability. In such a case, small text is more likely to be changed to white or black. Thus, if the size of the text cannot be changed, and the size of the text is relatively small, a more conservative approach is used, wherein the text is much more likely to be modified to black or white.

Also, increasing the size of small text reduces the significance of some of the other factors contributing to readability. Thus, readability may be improved by increasing the text size. The size of the text may be determined relative to the size of the display area. For example, a 10-point Times Roman font text on a 9-inch television screen may deserve an approach where the size is more likely to be increased. Conversely, this same size text on a 100-inch projection television would be less likely to be increased.

In an exemplary embodiment of the invention, if the difference in angle is within acceptable limits, and the difference in luminosity between the text and background is too low for good readability on the television display, the difference in luminosity between the text and the background is increased to a predetermined minimal amount. The predetermined minimal amount is the amount of difference of luminosity between foreground and background to ensure that the readability of the text. This value varies according to the absolute luminosities involved. Things that are very dark require more difference in brightness to be readable. Things that are fairly bright do not require as much of a difference in brightness. Further, the text may be limited to a maximum saturation level, for example less than or equal to 50% full saturation. Allowing the text to become too saturated tends to cause blurring.

Another factor evaluated prior to adjusting parameters is the relative importance of the text. For example, the text in question may not simply be colored, but also have a certain importance, e.g., a hyperlink that a viewer may click on. In this case, it may be more important to retain the color and font, to ensure that the text is recognized as a hyperlink. Thus, instead of changing the color, the font size may be increased to improve readability. Other types of text that may be considered important would be indicated by HTML and XML tags, which are interpreted by the browser 29. For example, in HTML, there are heading tags H1, H2, H3, and H4, which indicate different sizes of headings. Further, XML provides the browser 29 with more information about the text than HTML, thus allowing a more sophisticated evaluation of the relative importance of the text. For example, an XML encoding of a library catalogue may contain the title of the entry, a description of the entry, and the author of the entry. Thus, a viewer may decide that the title is more important than the description, and thus the color of the text associated with the title would be modified accordingly.

EXEMPLARY SOFTWARE PROGRAM

Figure 2:
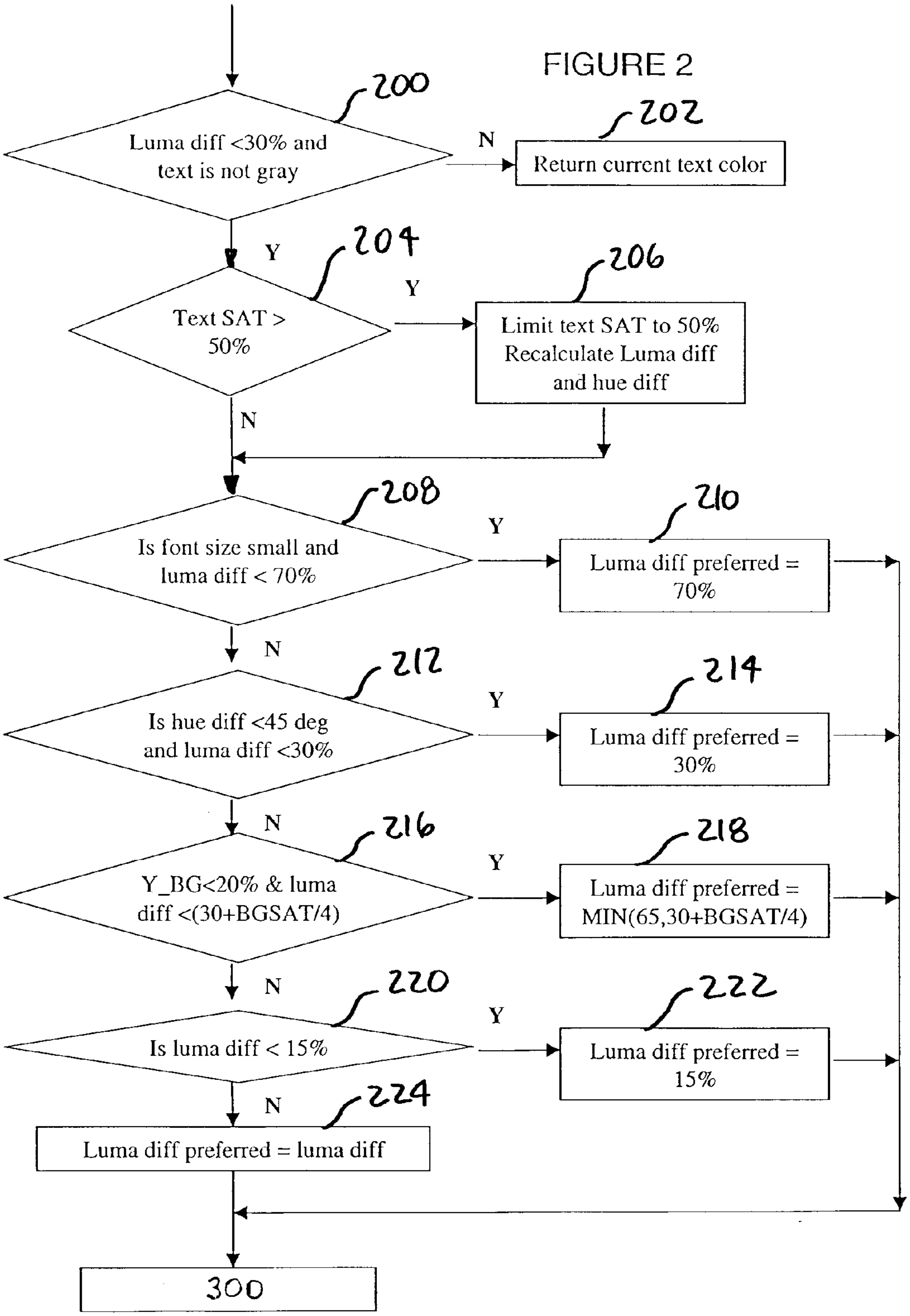
Figure 3:
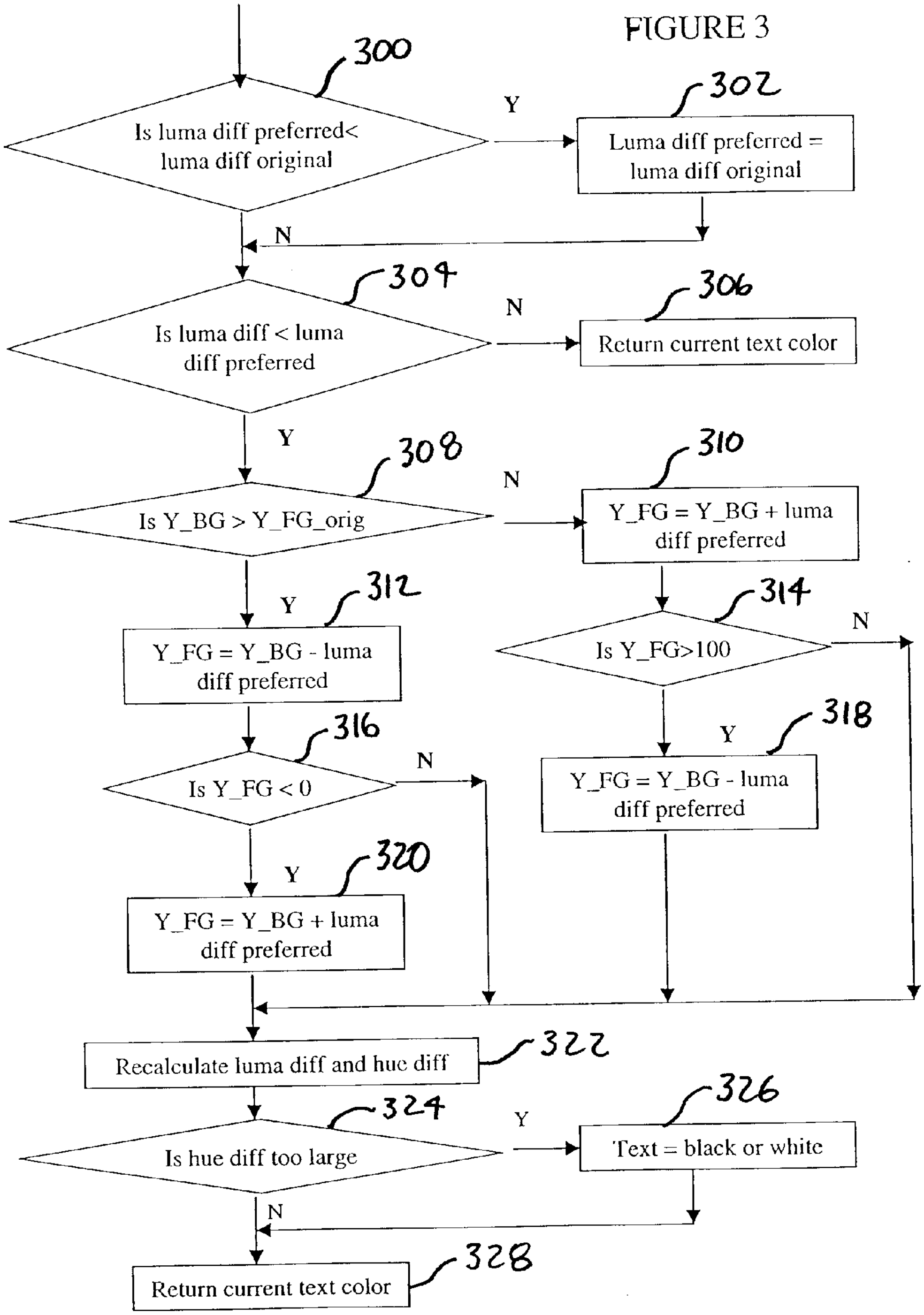

FIGS. 1–3 are flow chart diagrams of an exemplary software program for implementing the invention. The exemplary program is programmed in the C language, but other programming languages may be used.

The exemplary program has a function, called "Suggest_New_Color." At step 100, this function compares the foreground and background color. If they are identical, then at step 102, the function "Suggest_New_Color" returns and does nothing. (Many web sites intentionally hide words to make it easier for a search engine to find them, given certain key words, even though the key words may not appear in the visible text.) Thus if the colors are identical, the program assumes that hidden text is intended, and does not alter that. That is, if there are invisible words in the web site originally, the program keeps them invisible.

At step 104, if the foreground and background are different, the program extracts the red, green and blue components of the background and foreground.

At step 106, a conventional calculation is used for computing the foreground and background luminance (or luminosity), Y-FG and Y-BG. The program saves off the original luminosity of the foreground for later use. After the luminosity, the program then calculates the hue and saturation of the foreground and background. If the color is either black or white, the hue is undefined. The program treats it as an invalid hue, indicating that the color is a shade of gray.

At step 108, the difference in luminosity and the difference in hue (or phase angle) between the foreground and background are calculated. Hue and phase angle are interchangeable terms.

At step 110, the next test is to determine whether the font size is smaller than a threshold font. For example, the font may be considered smaller than the threshold if a 'small' font size is used. Any desired threshold for 'small' may be set. When using a 'small' font size, the program evaluates whether to convert it to either a black or white color depending on the luminosity of the background. If the font size is not 'small' then the program proceeds to step 116 and looks at the hue difference.

At step 112, if the luminosity is between 30 and 70 percent, then at step 114, the program forces the text to black or white. Otherwise the program attempts to retain the coloration of the text.

At step 116, if the hue difference is greater than 90 degrees for large luminance differences, and the background is more than minimally saturated (more than 25% saturated), then at step 118 the text is made white or black. Whether white or black is chosen depends on which provides a greater contrast with the background.

At step 120, if the hue difference is greater than 60 degrees for small luminance differences (less than 20%), and the background is more than minimally saturated (more than 25% saturated), the text is made white or black. Again, whether white or black is chosen depends on which provides a greater contrast with the background.

Next, a series of calculations are done to determine the new luminance to ensure sufficient contrast for readability.

Referring to FIG. 2, at step 200, if the luminance difference is less than 30%, and the text is not gray, then contrast may be insufficient, and a series of further tests are performed beginning at step 204. Otherwise, if the luminance difference is greater than 30% or the text is gray, then at step 202, the current text color is returned.

At step 204, if the text saturation is greater than 50%, then at step 206 the text saturation is reduced to 50%, and the luma difference and hue difference are recalculated.

At step 208, if a 'small' font is identified, then at step 210 the program sets a minimum luminance difference of 70%.

At step 212, if the text is very close in color to the background (within a 45 degree hue difference) then at step 214, the program sets a minimum luminance difference of 30%.

At step 216, if there is a very dark background (less than 20% luminance), then at step 218 the minimum luminance difference is set to 30% plus a percentage (25%) of the background saturation, because it's harder to see text against a very saturated background.

At steps 220, if the minimum luminance is less than 15%, then at steps 222 and 224 the minimum luminance difference is set to 15%.

At steps 300–306, if the original difference in luminance was greater than the minimum set (at steps 220–224), the original luminance difference is used.

At steps 308–322, the program attempts to keep the text darker or lighter than the background depending on whether it was originally darker or lighter. At step 308, if the background luminance is greater than the foreground, then at step 312, the foreground luminance is set to the background luminance minus the calculated preferred luminance difference. If the background luminance is less than or equal to the foreground, then at step 310, the foreground luminance is set to the background luminance plus the calculated preferred luminance difference.

At step 316, if the current difference would push the text luminance below 0%, then step 320 sets the foreground luminance to the other side of the background luminance to ensure sufficient luminance contrast with the background is retained.

At step 314, if the current difference would push the text luminance above 100%, then at step 318, the program sets the foreground luminance to the other side of the background luminance to ensure sufficient luminance contrast with the background is retained.

In either step 320 or 318, changing the luminance will affect the hue and saturation slightly. At step 322, the luminance difference and hue difference are recalculated.

At steps 324–328, the program checks that the changes in saturation and luminance haven't caused the hue to change such that the text would be hard to read against the background. If the hue change is too large, then at step 326, the text is changed to black or white. Otherwise, at step 328, the original text color is returned. This check is the same as the first check of hue difference above.

One of ordinary skill in the art can readily determine specific constants, values and thresholds to create improved readability without undue experimentation. The values typically lie on a continuum and implementation involves choosing a point or points in the continuum. In empirical tests, the inventors did not note any sharp cutoff points, clips or spikes.

The algorithm described above uses relatively sharp cutoffs, for example, the threshold hue difference criterion for determining whether to alter the text. For a variation of the exemplary embodiment, one may make all of these smoothly varying functions. The essential algorithm would be the same or very similar. For example, a fuzzy logic implementation may be used.

In the exemplary embodiment, the above-described program is executed by a processor 39 at the head end 12. However, the function of the program described above may be performed at the settop 16. If the browser 34 is located in the set top 16 (instead of at the head end 12), the program could operate the same way described above. The function also could reside in the graphics layer, which could be either at the head end or in the settop. In the exemplary embodiment, the graphics layer is used to limit the saturation of the background to a maximum of 80% saturation.

If the program actually rendered the data at the head end 12 in its original color, and then let the set top change it depending on the display device, then the algorithm for determining the new color might be similar, but it would work in a different way. The program could go through and find the individual pixels that correspond to the text and change them. Also, in a set top implementation, the program may have a different set of algorithms or rules, different cutoff points, or a different tradeoff corresponding to the type of display device. For example, the tradeoff might be different, depending on what device the output is displayed on. The text enhancement criteria or thresholds may differ for a digital TV, a set top hooked up to a computer monitor, or a set top hooked up to an LCD flat screen.

Although the exemplary embodiment is described for an implementation displaying text on a conventional television display, the invention may be applied to other displays, such as a computer display. The algorithm would be modified for the types of problems that are not present in computer displays. For example, computer displays don't have the hue difference problem. A computer display still can have problems with insufficient luminance difference between background and text. The luminance comparison and enhancement or the saturation limitations of the exemplary algorithm can be used for computer text.

Another point to note, although the exemplary embodiment is described in the context of NTSC television displays, the invention may also be applied for other systems, for example to PAL. PAL has a different set of issues with color, but the same general ideas of modifying the text colors to avoid the problems apply. Color is encoded in PAL in a slightly different form, but it still has similar issues to NTSC. The invention may be used in PAL systems to improve readability of text where the hue difference is too great.

Other embodiments of the invention use more complex algorithms for deciding when to alter the text, for example, using the multidimensional map of all the different variables against each other in more complex implementation. More generally, embodiments of the invention are applied to generally modify colors, size or fonts to improve readability on any sort of display, taking into account what the characteristics of the display are, how the display encodes color, how the display encoding deals with close levels of brightness and how well it does at resolving them.

Alternative embodiments of the invention may be used with a digital TV, which may have digital or component outputs and therefore may not have hue difference issues, but might have the other issues discussed above. The difference between televisions that use interlaced versus progressive scan is that the user may be willing to live with larger hue differences for example, with progressive scan than interlaced because of flicker issues. Interlaced displays flicker more than non-interlaced. Another alternative embodiment of the invention may be used with the SECAM standard.

Clearly, one of the factors in deciding what criteria to apply and what adjustments to make is the type of TV used. In fact, even the size of the TV may matter as well. For example, for a small TV, the algorithm may be more likely to bump up the size of the text. Or, for a small TV, the program may be more likely to force the text to a full white or a full black to make sure it's visible (by lowering the threshold for altering the text).

Normally, the type of TV would be an input to the algorithm and that information would be obtained either from the set top or from some form of database or other user preference information. This would be particularly useful when it comes to making sure text is readable. The smaller the TV, the more of a problem it is to read small text or text that has minimal contrast. If the TV is large front-projection TV, the text size is not as much of an issue. However, for a small TV sitting on a tabletop, the size of the text is more of an issue. In an alternative embodiment, there could be a setup option to input the type or size of the display. Essentially, when the user first signs on, he or she may be asked what size TV they have. The user would enter in a value, such as, "33 centimeters," "50 centimeters," or "67 centimeters," and that information could be stored with the user information for that set top so that the browser could make use of the information.

Similarly, the setup program could allow the user to indicate the type of television, e.g., digital TV, regular NTSC TV, etc. The setup program may allow the user to identify a specific brand and model.

Alternatively, information about the TV could be determined by the set top. For example, the television may have a memory device (such as a read only memory) encoded with information identifying the type, size, brand and/or model of the TV. The set top could automatically interrogate this memory device to obtain the desired information.

As a further alternative, the setup program may allow the user to input user preferences for text enhancement. For example, the user may be given the opportunity to select from the above-mentioned factors that are used by the basic algorithm described above. For example, a user having very poor eyesight may ask for more readable or larger text. In response, the system would be much more aggressive about increasing the size of text or forcing text to black or white (for example, by reducing the threshold values for text adjustment).

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the invention includes other variants and embodiments which may be made by those skilled in the art without departing from the scope and range of equivalents of the appended claims.

What is claimed:

1. A method for processing display data comprising text and a background, comprising the steps of:

(a) evaluating a combination of the text and background against at least one objective criteria to provide at least one objective value;

(b) determining whether at least one objective value exceeds a respective threshold indicative of text-background combinations that are difficult to road; and (c) adjusting at least one of the text and the background if the at least one objective value is beyond the threshold so that the at least one objective value is within the threshold after the adjusting, said adjusting including reducing a difference in phase angle between respective colors of the text and background.

2. The method of claim 1, wherein the objective criteria include at least one of the group consisting of text color hue, text color saturation, text color luminosity, background color hue, background color saturation, background color luminosity, text font, text font size, and text characteristics.

3. The method of claim 2, wherein the text characteristics include at least one of the group consisting of shadowing, underlining, bold, italics, and blinking text.

4. The method of claim 1, further comprising:

receiving the display data comprising the text and background from the internet before step (a); and displaying the adjusted display data on a television after step (c).

5. The method of claim 4, further comprising storing the adjusted display data in a cache at a cable headend.

6. The method of claim 1, wherein step (c) includes adjusting the text to be white or black.

7. The method of claim 1, wherein step (c) includes increasing a difference in luminosity between the text and the background.

8. The method of claim 7, wherein the increase in difference in luminosity is calculated to compensate for gamma effects.

9. The method of claim 1, wherein step (c) includes reducing a level of saturation of the text or background.

10. The method of claim 1, wherein step (c) includes adjusting a size of the text.

11. A system for processing display data comprising text and a background, comprising:

means for evaluating a combination of the text and background against at least one objective criteria to provide at least one objective value;

means for determining whether at least one objective value exceeds a respective threshold indicative of ten-background combinations that are difficult to read; and means for adjusting at least one of the text and the background if the at least one objective value is beyond threshold so that the at least one objective value is within threshold after the adjusting, wherein the adjusting means reduces a difference in phase angle between respective colors of the text a background.

12. The system of claim 11, wherein the objective criteria include at least one of the group consisting of text color hue, text color saturation, text color luminosity, background color hue, background color saturation, background color luminosity, text font, text font size, and text characteristics.

13. The system of claim further comprising:

means for receiving the display data comprising the text and background from the Internet; and means for displaying the adjusted display data on a television.

14. The system of claim 13, wherein the evaluating means, determining means and adjusting means are included in a processor at a cable headend, the system further comprising a cache at a cable headend for storing the adjusted display data.

15. The system of claim 11, wherein the adjusting means adjusts the text to be white or black.

16. The system of claim 11, wherein the adjusting means increases a difference in luminosity between the text and the background.

17. The system of claim 16, wherein the increase in difference in luminosity is calculated to compensate for gamma effects.

18. The system of claim 11, wherein the adjusting means reduces a level of saturation of the text or background.

19. The system of claim 11, wherein the adjusting means adjusts a size of the text.

20. The system of claim 11, wherein the evaluating means, determining means and adjusting means are located in a processor in a set top converter box.

21. A computer readable medium comprising computer program code, wherein when the computer program code is executed by a processor, the processor performs a method for processing display data comprising text and a background, comprising the steps of:

(a) evaluating a combination of the text and background against at least one objective criteria to provide at least one objective value;

(b) determining whether at least one objective value exceeds a respective threshold indicative of text-background combinations that are difficult to read; and (c) adjusting at least one of the text and the background if the at least one objective value is beyond the threshold so that the at least one objective value is within the threshold after the adjusting, said adjusting including reducing a difference in phase angle between respective colors of the text and background.

22. The computer readable medium of claim 21, wherein the objective criteria include at least one of the group consisting of text color hue, text color saturation, text color luminosity, background color hue, background color saturation, background color luminosity, text font, text font size, and text characteristics.

23. The computer readable medium of claim 21, wherein the method further comprises:

receiving the display data comprising the text and background from the Internet before step (a); and displaying the adjusted display data on a television after step (c).

24. The method of claim 23, wherein the method further comprises storing the adjusted display data in a cache at a cable headend.

25. The computer readable medium of claim 21, wherein step (c) includes adjusting the text to be white or black.

26. The computer readable medium of claim 21, wherein step (c) includes increasing a difference in luminosity between the text and the background.

27. The method of claim 26, wherein the increase in difference in luminosity is calculated to compensate for gamma effects.

28. The computer readable medium of claim 21, wherein step (c) includes reducing a level of saturation of the text or background.

29. The computer readable medium of claim 21, wherein step (c) includes adjusting a size of the text.

30. An electrical signal encoded with computer program code, wherein when the computer program code is executed by a processor, the processor performs a method for processing display data comprising text and a background, comprising the steps of:

(a) evaluating a combination of the text and background against at least one objective criteria to provide at least one objective value;

(b) determining whether at least one objective value exceeds a respective threshold indicative of text-background combinations that are difficult to read; and (c) adjusting at least one of the text and the background if the at least one objective value is beyond the threshold so that the at least one objective value is within the threshold after the adjusting, wherein the adjusting means reduces difference in phase angle between respective colors of the text and background.

* * * * *

UNITED STATES PATENT AND TRADEMARK OFFICE

CERTIFICATE OF CORRECTION

PATENT NO. : 6,788,308 B2
DATED : September 7, 2004
INVENTOR(S) : Reavy et al.

It is certified that error appears in the above-identified patent and that said Letters Patent is hereby corrected as shown below:

Column 10,
Line 65, "road" should be -- read --;

Column 11,
Line 36, "ten" should be -- text --;
Line 40, insert -- the -- before "threshold";
Line 44, "a" should be -- and --;
Line 49, after "claim" insert -- 11 --;

Column 12,
Line 34, "23" should read -- 21 --;
Line 64, insert -- a -- after "reduces".

Signed and Sealed this

Second Day of November, 2004

JON W. DUDAS
*Director of the United States Patent and Trademark Office*